No. 733,540. PATENTED JULY 14, 1903.
J. W. CARTER, DEC'D.
J. T. CARTER, ADMINISTRATOR.
VEHICLE TIRE.
APPLICATION FILED JUNE 22, 1896. RENEWED OCT. 6, 1899.
NO MODEL.
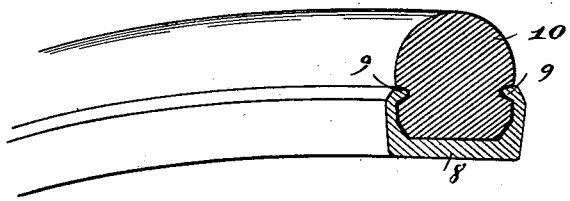
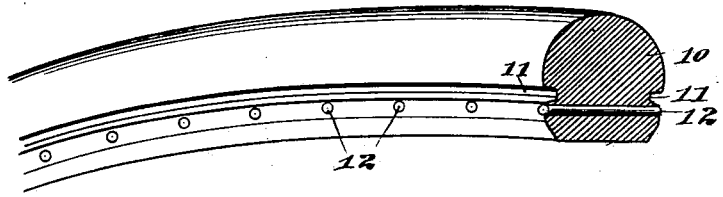
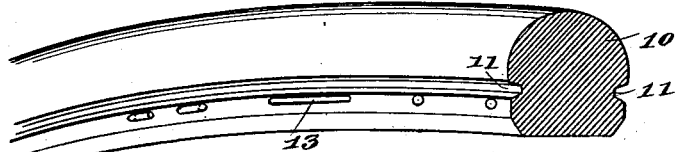
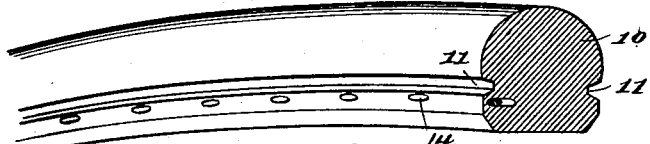
Witnesses,
Inventor,
John Thomas Carter
Administrator of John W. Carter, Deceased
by Offield, Towle & Linthicum
Att'ys.

No. 733,540. Patented July 14, 1903.

UNITED STATES PATENT OFFICE.

JOHN THOMAS CARTER, OF RACETRACK, MONTANA, ADMINISTRATOR OF JOHN W. CARTER, DECEASED, ASSIGNOR OF ONE-HALF TO CHARLES A. WARREN, OF CHICAGO, ILLINOIS.

VEHICLE-TIRE.

SPECIFICATION forming part of Letters Patent No. 733,540, dated July 14, 1903.

Application filed June 22, 1896. Renewed October 6, 1899. Serial No. 732,825. (No model.)

*To all whom it may concern:*

Be it known that JOHN W. CARTER, late a citizen of the United States, and a resident of Chicago, Illinois, now deceased, did during his lifetime invent certain new and useful Improvements in Vehicle-Tires, of which the following is a specification.

Said invention relates more particularly to that class of vehicle-tires which have a cushion composed of a solid band or ring of rubber encircling the rim of the vehicle-wheel and which are usually applied to the periphery of a metal tire, and the principal feature of the invention relates to means for securing the rubber cushion to the tire or rim. The invention might also be applied to pneumatic tires.

In the accompanying drawings, Figure 1 is a perspective view of a broken section of a metal tire and its cushion. Fig. 2 is a similar view of a section of the cushion, showing the retaining means. Fig. 3 is a similar view showing a modification. Figs. 4 and 5 are perspective views of a metal retainer in the form of a bent wire staple. Fig. 6 is a perspective view of another modification consisting of a continuous wire retainer; and Fig. 7 is a sectional plan view of the cushion, showing a continuous wire embedded therein.

8 represents a section of a metal rim for a vehicle-wheel having a channel in its outer side and with inturned flanges or lips 9. The cushion is shown as a solid ring of rubber, the body of which is marked 10 and which has in its sides the groove 11, adapted to receive the inturned flanges 9.

The provision of interlocking flanges and grooves is not new in itself and is inadequate without some special additional provision to hold the cushion upon the tire. Hence various expedients have been devised for effecting such a locking together of the parts as will prevent the withdrawal of the cushion from its seat. The most common construction is to provide a longitudinal cavity through the body of the cushion and thread a binding or retaining wire through this cavity, so as to completely encircle the rim and to interlock the ends of the retaining-wire. This method of construction is expensive and not fully efficient. To avoid that expense and yet to provide for securing and retaining the cushion in place, in the present invention there is combined with the body of the cushion metallic retaining means preferably extending through the rubber body transversely just below the plane of the grooves. As shown in Fig. 2, metal pins 12 of a length equal to the diameter of the body 10 are employed, the ends of the pins being exposed below the grooves 11. These pins may be driven through the rubber body or molded therewith and will be held in place by the elasticity of the rubber. Their ends being extended below the grooves will engage on the under sides of the lips 9 and effectually prevent the withdrawal of the cushion 10 from its seat.

In Figs. 3, 4, and 5 are shown wire staples 13, which take the place of the pins 12, the head of the staples forming the retaining means upon one side and the legs of the staples performing a similar office on the opposite side of the rubber body. The extremities of the legs may be turned over, as shown at the left of Fig. 3 and in Fig. 5.

Another modification is shown in Fig. 6, where a continuous wire 14 is embedded in the rubber body 10, said wire being of sinuous form and bent or corrugated, the bends or knees extending to the surface of the rubber body and forming the retaining means. In this construction the wire will be bent to shape and the rubber body will be formed around it. When the pins or staples are used, they may be driven into the rubber body after the latter is formed.

It will be understood that the forms of the retaining means above described are illustrative of some of the many ways in which the invention may be carried out and that various modifications of the structural details may be made without departing from the invention.

The invention above described affords an economical and efficient means of securing the cushion to the rim of a vehicle-wheel.

The invention may be applied to a pneumatic tire, and in such case the continuous wire would be most effective. Such wire could be embedded in the integral retaining-flange usually provided to form the clench, and the bends of the wire may project beyond the plane of the sides to form loops to engage buttons or other hooking devices on the wooden or metal rim.

If desired to insure against corrosion of the metal-retaining devices, the wires or rods of which the same are made may be coated with rubber or other isolating material.

What is claimed is—

1. In a vehicle-tire, the combination with a channeled rim having substantially vertical side walls provided with inwardly-extending flanges, of an annular rubber cushion-tire the inner or base portion of which snugly fits the channel of the rim in contact with the inner surface thereof throughout, and metallic retaining devices embedded in and extending entirely through the base of the tire transversely thereof, said retaining devices at their opposite ends contacting the inner surfaces of the side walls, and on the outer sides of their end portions lying in contact also with the inner surface of the flanges, substantially as described.

2. In a vehicle-tire, the combination with a channeled rim having substantially vertical side walls provided with inwardly-extending flanges, of an annular rubber cushion-tire snugly seating in said rim in contact with the inner surface thereof throughout, said tire having external grooves in its side walls which are filled by said flanges, and a series of metallic pins embedded in and extending entirely through said tire, said pins at their opposite ends contacting the inner surfaces of the side walls, and on the outer sides of their end portions lying in contact also with the inner surface of the flanges, substantially as described.

3. The combination, with a channeled metal rim having inturned lips or flanges at the outer margins of its lateral walls, of a rubber cushion having lateral grooves adapted to receive said lips or flanges, and metallic retaining devices embedded in the body of the rubber cushion below and adjacent to the plane of the bottom of the grooves thereof, said retaining devices extending transversely of the body of the cushion to the lateral surfaces thereof so that their lateral terminals are exposed, said retaining devices terminating laterally at or inside of the inner surfaces of the walls of the channel of the metal rim and being adapted to engage beneath the inturned lips or flanges at the outer margins thereof, substantially as described.

4. The combination, with a channeled metal rim having inturned lips or flanges at the outer margins of its lateral walls, of a rubber cushion having grooves to receive said lips or flanges, and a retaining device consisting of a continuous wire of sinuous form embedded in the rubber body and having its bends projecting alternately to the edges of the rubber body and adapted to engage with the lips or flanges of the metal rim, substantially as described.

5. The combination with a rubber vehicle-tire of a continuous wire of sinuous form embedded in the rubber body and having its bends projecting alternately to the edges of the rubber body, substantially as described.

JOHN THOMAS CARTER,
*Administrator of the estate of John W. Carter, deceased.*

Witnesses:
C. C. LINTHICUM,
FREDERICK C. GOODWIN.